United States Patent

Schoen et al.

[15] 3,639,017
[45] Feb. 1, 1972

[54] STABLE BALL CAGE

[72] Inventors: George J. Schoen, Danbury; Lewis W. McKee, Arrowhead Point, both of Conn.

[73] Assignee: The Barden Corporation, Danbury, Conn.

[22] Filed: Mar. 6, 1970

[21] Appl. No.: 17,525

[52] U.S. Cl. ...................................................308/201
[51] Int. Cl. ................................................F16c 33/38
[58] Field of Search ..........................308/201, 217, 212, 213

[56] References Cited

UNITED STATES PATENTS

| 1,392,920 | 10/1921 | Dane et al. | 308/201 |
| 2,838,348 | 6/1958 | Hamm | 308/201 |

FOREIGN PATENTS OR APPLICATIONS

| 127,129 | 5/1919 | Great Britain | 308/201 |
| 575,369 | 2/1946 | Great Britain | 308/201 |
| 852,123 | 10/1939 | France | 308/201 |

Primary Examiner—Martin P. Schwadron
Assistant Examiner—Frank Susko
Attorney—Shenier and O'Conner

[57] ABSTRACT

A bearing cage for a ball bearing in which the annular cage body has a plurality of radially extending ball pockets and a centrally located annular groove in its inner surface or in its outer surface, the depth of the groove relative to its width being sufficiently great that in operation of a ball bearing incorporating the cage the balls engage the cage only at the radially extending edges formed by the sides of the groove at the pockets and not at the edge formed by the base of the groove at the pockets so as to drive the cage by forces which are at an angle to the direction of cage rotation.

13 Claims, 7 Drawing Figures

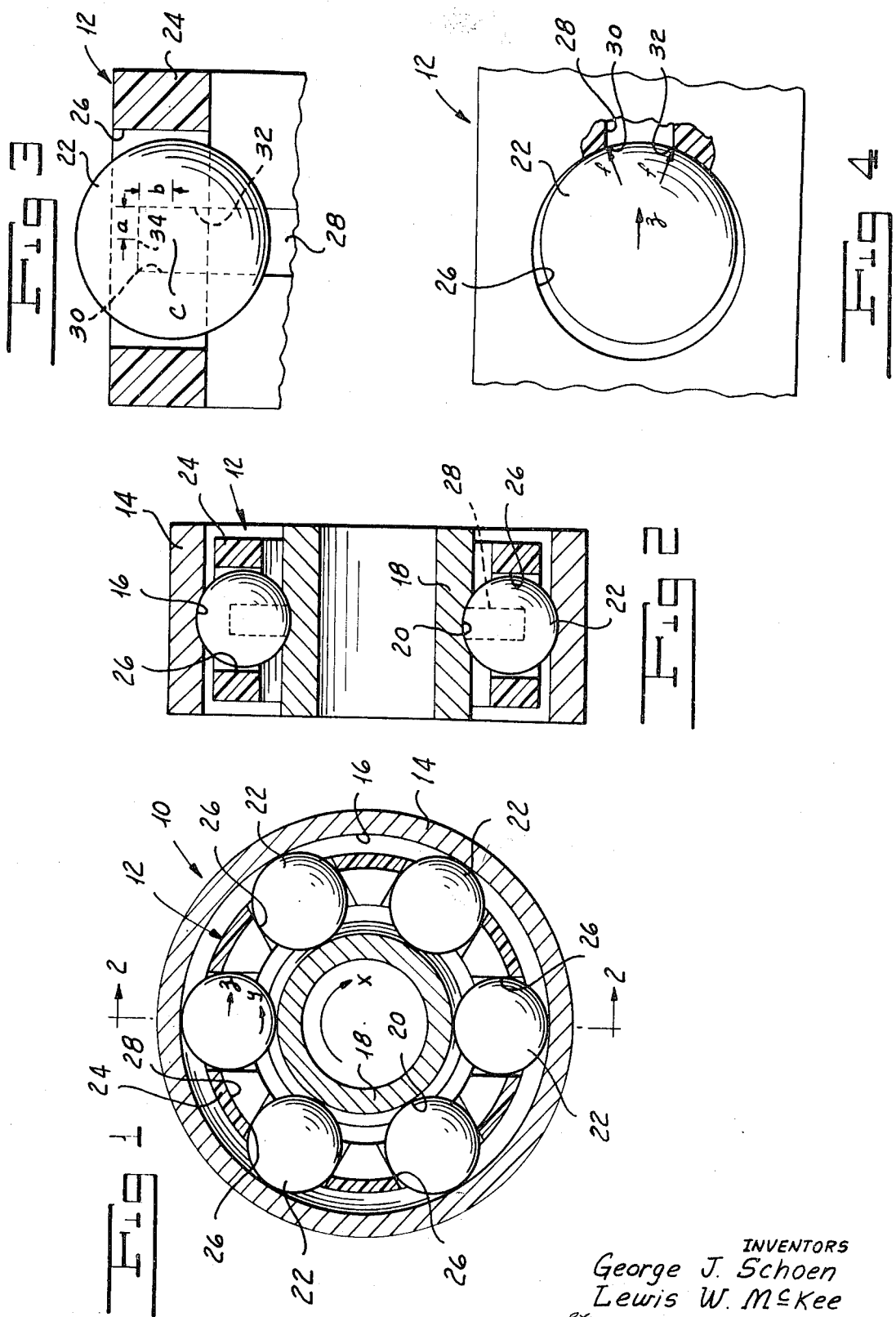

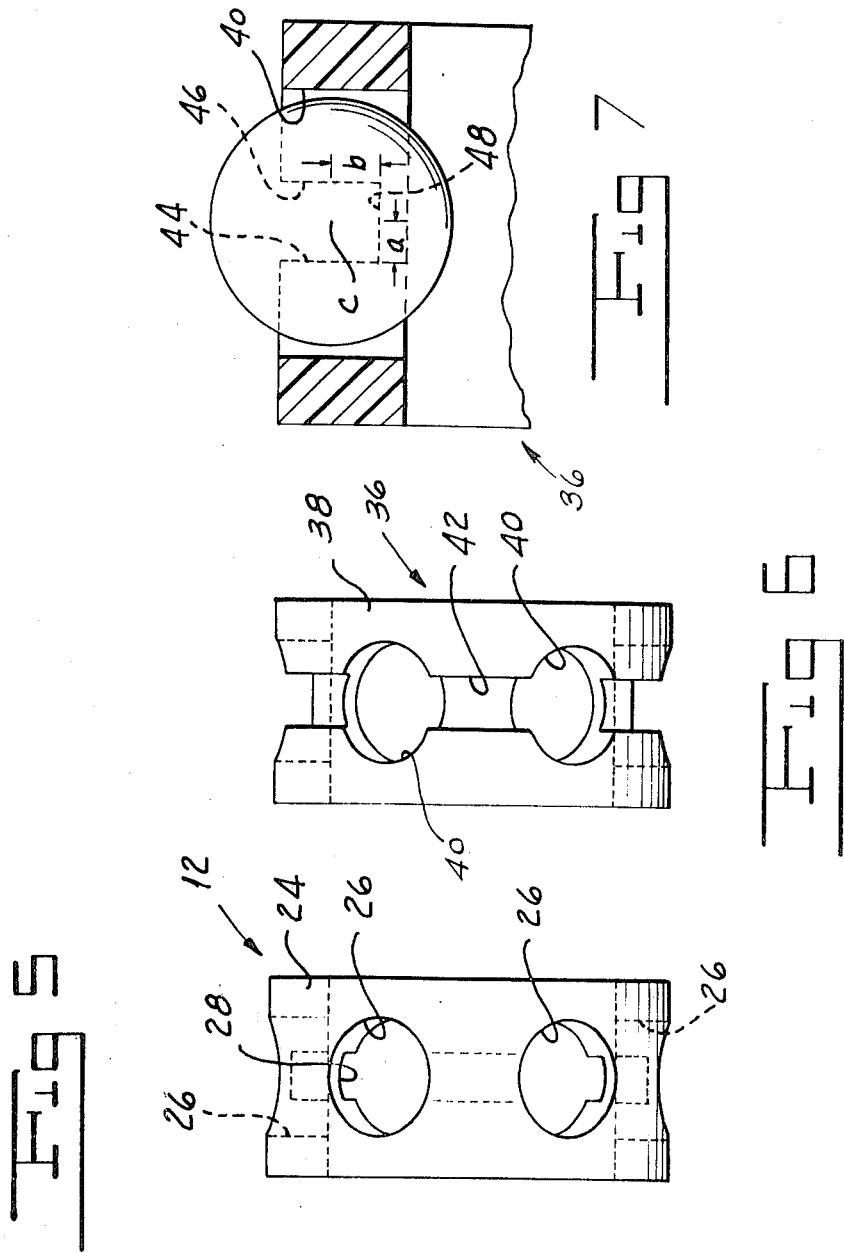

STABLE BALL CAGE

BACKGROUND OF THE INVENTION

Various forms of ball cages for the rolling elements of a ball bearing are known in the prior art. A common type of cage comprises an annular body formed with a plurality of radially extending pockets for receiving the bearing balls. In the usual operation of a bearing of this type the inner ring is driven so as to rotate the balls on the stationary outer ring. As the balls roll on the outer ring they engage the pocket walls so as to drive the cage. Ideally the balls, in driving the cage, make substantially point contact with the walls of the pockets on the locus of a circle concentric with the axis of rotation of and centrally located with relation to the cage. This ideal condition is not often achieved in practice with the result that the operation of the bearing is not as stable as is desirable.

We have discovered that the instability described above can be greatly reduced if the balls exert a driving force on the cage in directions at an angle to the direction of rotation of the cage. We have invented a bearing cage which is more stable in operation than are bearing cages of the prior art. Our bearing cage causes the balls to exert a driving force on the cage in directions making an angle with the direction of movement of the cage. Our cage is simple in construction and easy to manufacture. It is relatively inexpensive for the result achieved thereby.

SUMMARY OF THE INVENTION

One object of our invention is to provide a bearing cage which is more stable than are bearing cages of the prior art.

Another object of our invention is to provide a bearing cage which causes the balls to exert a driving force on the cage in directions at an angle to the direction of rotation of the cage.

A further object of our invention is to provide a stable bearing cage which is simple in construction.

Still another object of our invention is to provide a stable bearing cage which is inexpensive to manufacture.

Other and further objects of our invention will appear from the following description.

In general our invention contemplates the provision of a bearing cage comprising an annular body having spaced radially extending ball-receiving pockets and having a centrally located annular groove either in its inner or in its outer surface with the depth of the groove relative to its width bearing sufficiently great to cause the balls to engage only the edges formed by the groove sides at the pockets and not the edge formed by the groove base at the pockets to result in the application by the balls to the cage of a force in directions making an angle with the direction of movement of the cage.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a sectional view of a ball bearing incorporating one form of our staple bearing cage.

FIG. 2 is a sectional view of the bearing shown in FIG. 1 taken along the line 2—2 of FIG. 1.

FIG. 3 is a fragmentary sectional view of the form of our stable bearing cage illustrated in FIG. 1 showing the action of the cage.

FIG. 4 is a fragmentary top plan view of the form of our stable bearing cage illustrated in FIG. 1 with a part broken away further showing the mode of action of the cage.

FIG. 5 is a side elevation of the form of our bearing cage illustrated in FIG. 1.

FIG. 6 is a side elevation of an alternate embodiment of our stable bearing cage.

FIG. 7 is a fragmentary sectional view of the form of our cage illustrated in FIG. 6 showing the action of the cage.

DESCRIPTION OF THE PREFERRED EMBODIMENT

Referring now to FIGS. 1 to 5 we have illustrated a bearing indicated generally by the reference character 10 incorporating one form of our stable bearing cage indicated generally by the reference character 12. The bearing 10 includes an outer ring 14 formed of any suitable material known to the art such for example as steel or the like provided with a raceway 16. The inner ring 18 of the bearing 10 is provided with a raceway 20. As is known in the art, a plurality of balls 22 are adapted to ride between the rings 14 and 18 in the raceways 16 and 20.

Our stable bearing cage 12 may be formed of any suitable material known to the art such for example as porous sintered nylon or of any other appropriate material. The cage 12 includes an annular body 24 provided with a plurality of spaced generally radially extending ball-receiving pockets 26 for the balls 22.

We provide the form of our cage 12 illustrated in FIGS. 1 to 5 with a radially outwardly extending generally centrally located annular groove 28. Groove 28 extends into each of the pockets so as to form edges 30 and 32 in the pocket at the sides of the groove and an edge 34 at the base of the groove. We so construct groove 28 as to permit contact between the cage 12 and the balls 22 only at the edges 30 and 32 and not at the edge 34. This can readily be achieved by making the groove sufficiently deep relative to its width that the distance $a$ from the center of rotation C of a ball to each of the edges 30 and 32 is less than the distance $b$ from the center of rotation C to the base edge 34. When that is done, the driving force imparted by the balls to the cage 12 is in directions indicated by arrows $f$ in FIG. 4, at an angle to the direction of rotation of the cage, indicated by arrow $z$.

Referring now to FIGS. 6 and 7 we have shown an alternate form of our cage indicated generally by the reference character 36 made up of annular body 38 having radially extending ball pockets 40. In this form of our invention, rather than providing a radially outwardly extending centrally located internal groove such as groove 28 we provide an external and radially inwardly extending centrally located annular groove 42. As was the case with the groove 28 groove 42 forms edges 44 and 46 at its sides at a pocket 40 and a base edge 48 at each pocket 40. Again, we make the groove sufficiently deep that edges 44 and 46 are closer to the center C of rotation of the ball than is the edge 48.

A bearing such as the bearing 10 incorporating either form of our cage 12 or 36 may be assembled in any manner known to the art. In operation of the bearing when the inner ring 18 for example is driven in the direction of the arrow $x$ the balls roll on the outer raceway 16 in a direction $y$ around the centers of the balls. Owing to that rotation the ball centers move in the direction of the arrow $z$. Owing to the fact that the balls are permitted only to contact edges 30 and 32, the driving force applied to the cage by the balls is in directions indicated by arrows $f$ making an angle with the direction of movement of the cage. The application of the driving force to the cage in this manner compensates for small defects in manufacture and minimizes instability of the assembly.

It will be seen that we have accomplished the objects of our invention. We have provided a bearing cage which minimizes instability in operation of a bearing assembly incorporating the cage. Our cage causes the driving force exerted thereon by the balls to be in directions which make an angle with the direction of rotation of the cage. Our cage is simple in construction and is inexpensive to manufacture for the result achieved thereby.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A bearing cage for receiving a ball for rotation on a center on the locus of a circle comprising an annular body including said locus, a radially extending ball pocket formed in said body, and a radially directed recess formed in said body adjacent to and leading into said pocket, said recess extending radially from a surface of said body through said locus.

2. A bearing cage as in claim 1 in which said recess is located symmetrically in respect of a plane normal to the axis of and bisecting the body.

3. A bearing cage as in claim 1 in which said recess extends generally radially outwardly from the inner surface of said annular body.

4. A bearing as in claim 1 in which said recess extends generally radially inwardly from the outer surface of said annular body.

5. A bearing cage for receiving balls for rotation on centers on the locus of a circle comprising an annular body including said locus, a plurality of circumferentially spaced radially extending ball pockets in said body, and a generally centrally located radially directed groove formed in said body, said groove leading into said pockets and extending radially from a surface of said body through said locus.

6. A bearing cage as in claim 5 in which said groove is generally rectangular in cross section.

7. A bearing cage as in claim 5 in which said groove is symmetrical with a central plane perpendicular to the axis of said body.

8. A bearing cage as in claim 5 in which said groove extends radially outwardly from the inner surface of said body.

9. A bearing cage as in claim 5 in which said groove extends radially inwardly from the outer surface of said body.

10. A bearing assembly including in combination an inner ring having a raceway therein, an outer ring having a raceway therein, balls disposed between said rings in said raceways for rotation on centers on the locus of a circle, and a cage comprising an annular body including said locus, said cage being formed with a plurality of radially extending pockets for reviewing said balls, and a centrally located radially extending groove formed in the wall of said body, said groove leading into said pockets and extending radially from a surface of said body through said locus to provide spaced points of engagement between each of said balls and said cage as said balls rotate.

11. A bearing assembly as in claim 10 in which said groove is formed with a rectangular cross section to provide radially extending edges at said pockets, said points being located on said edges.

12. A bearing assembly as in claim 10 in which said groove is symmetrical with a central plane perpendicular to the axis of rotation of said bearing.

13. A bearing assembly as in claim 10 in which said groove is formed with a generally rectangular cross section to provide radially extending edges and an axially extending edge at said pockets, the distance of said axially extending edge from the center of rotation of the associated ball being greater than the distance from said center to said radially extending edge.

* * * * *